(12) United States Patent
Blotteaux

(10) Patent No.: US 7,128,669 B2
(45) Date of Patent: Oct. 31, 2006

(54) IMPACT LAYER TECHNOLOGY SHAFT

(75) Inventor: Ray Blotteaux, Ferndale, WA (US)

(73) Assignee: Sport Maska Inc., Westmount (CA)

( * ) Notice: Subject to any disclaimer, the term of this patent is extended or adjusted under 35 U.S.C. 154(b) by 0 days.

(21) Appl. No.: 10/624,116

(22) Filed: Jul. 21, 2003

(65) Prior Publication Data

US 2004/0102263 A1 May 27, 2004

(30) Foreign Application Priority Data

Jul. 17, 2003 (CA) .................................. 2435340

(51) Int. Cl.
*A63B 59/14* (2006.01)

(52) U.S. Cl. ...................................................... 473/561

(58) Field of Classification Search ......... 473/560–563
See application file for complete search history.

(56) References Cited

U.S. PATENT DOCUMENTS

| 4,013,288 A | 3/1977 | Goverde |
| 4,124,208 A | 11/1978 | Burns |
| 4,159,114 A | 6/1979 | Ardell et al. |
| 4,172,594 A | 10/1979 | Diederich |
| 4,591,155 A | 5/1986 | Adachi |
| 5,050,878 A | 9/1991 | Deleris |
| 5,217,221 A | 6/1993 | Baum |
| 5,333,857 A | 8/1994 | Lallemand |
| 5,655,981 A * | 8/1997 | Reed ........................... 473/560 |
| 5,865,696 A | 2/1999 | Calapp et al. |
| 5,928,090 A | 7/1999 | Cabales et al. |
| 6,033,328 A | 3/2000 | Bellefleur et al. |
| 6,155,932 A | 12/2000 | Cabales et al. |
| 6,206,793 B1 * | 3/2001 | Burger ........................ 473/561 |
| 6,241,633 B1 * | 6/2001 | Conroy ....................... 473/561 |
| 6,358,166 B1 * | 3/2002 | Yu .............................. 473/561 |
| 2002/0037780 A1 | 3/2002 | York et al. |
| 2002/0094891 A1 * | 7/2002 | Horwood et al. ........... 473/560 |
| 2002/0128094 A1 | 9/2002 | Manory |
| 2003/0008734 A1 | 1/2003 | Tiitola |

FOREIGN PATENT DOCUMENTS

| DE | 2061778 | * | 9/1971 |
| GB | 637779 | * | 5/1950 |

* cited by examiner

*Primary Examiner*—Mark S. Graham
(74) *Attorney, Agent, or Firm*—Timothy J. Keefer; Seyfarth Shaw LLP

(57) ABSTRACT

The present invention discloses a composite hockey stick shaft having an elongated body having four side wall members, at least one said side wall members comprising an inner layer of fibers disposed within a matrix material, a layer of viscoelastic material anchored onto to the outside surface of said inner layer, an outer layer of fibers disposed within a matrix material, said outer layer being disposed on and abutting the outside of said layer of viscoelastic material.

10 Claims, 5 Drawing Sheets

IMPACT LAYER TECHNOLOGY SHAFT

BACKGROUND OF THE INVENTION

The present invention relates to sporting equipment shafts and in particular to shafts suitable for use in high-impact, high-velocity, and high wear and tear sports such as ice hockey, street hockey, in-line skate hockey, ringuette, field hockey, lacrosse and other such sports. The present invention, by way of example only, will be described hereinafter in relation to ice hockey sticks, but it is understood that the invention herein described and claimed may be suitably adapted to other shaft applications and in particular to other sports.

At present, hockey sticks may be generally broken down into two broad categories, namely wooden hockey sticks, which shafts are generally made of wood such as any suitable hardwood, for example hickory, maple, etc., and composite sticks, which shafts are made of composite materials, such as carbon fiber, Kevlar™, fiberglass, and other such materials or combination of materials which are embedded in any one of a number of resins. The present invention relates to composite hockey sticks.

Composite hockey stick shafts are in many ways superior to conventional wooden shafts in that they may be stronger and lighter, thus allowing a player to deliver more strength to the puck during play, such as during slapshots, wrist shots, any hard shot and during passing. In addition, composite hockey stick shafts, depending on their method and materials of construction, may exhibit superior characteristics with respect to torsional resistance, bending-moment resistance, shear resistance and are often preferred by both amateur and professional players alike. However, composite hockey stick shafts may exhibit poor or sub-standard resistance to direct impacts thereon which stick shafts are often subjected to during play, in particular when compared to wood shafts. For example, composite hockey stick shafts which receive a direct hit thereon, from either another stick, a puck, or which are hit against the boards, against the ice or against any other object have been known to crack, shatter, delaminate, or break apart. This results from a characteristic of some composite hockey shift shafts in that they are brittle, exhibit little ductile deformation characteristics and have poor impact-absorbing ability.

It is therefore an object of the present invention to provide for a composite hockey stick shaft having a particular construction which enables the shaft to better absorb impacts and resist deformation resulting from impact loading thereon.

It is a further object of the present invention to provide composite hockey stick shafts wherein the materials and method of construction thereof allow for impact dissipation such that the forces of impact are spread up and down the length of the shaft and are not localized.

It is a further object of the present invention to provide a composite hockey stick shaft comprising a viscoelastic layer which provides for improved impact-absorption characteristics such that energy generated by an impact may be dissipated away from the localized area of the impact, thus reducing the stress transferred on the composite materials at the point of impact.

It is a further advantage of the present invention to provide a composite hockey stick shaft having increased strength and durability along the shaft thereof.

SUMMARY OF THE INVENTION

The present invention generally provides for a composite hockey stick shaft wherein the structure of the shaft, the fibers in the resin matrix known as the constraining layer, is overlaid by an outer layer of viscoelastic material disposed thereon which acts to dampen and absorb the shocks and impacts which are administered to the shaft during play. In particular, the viscoelastic material may be disposed over substantially the whole length of the shaft, and cover all four sides of the shaft, or alternatively, it may be disposed over only part of the length of the shaft, and may cover one or more of the four sides of the shaft.

In a further embodiment, the viscoelastic layer may itself be overlaid with a base layer of composite materials whose function may be to provide protection to the viscoelastic layer against mechanical wear and tear (damage) of the viscoelastic layer. The base layer may be hardened and may be thin, i.e. thinner than the so as to minimize weight. The base layer may overlay the whole of the viscoelastic layer or only a portion thereof.

In accordance with a general aspect of the present invention, the constraining layer may be assembled and manufactured in accordance with any number of well-known methods of fabricating composite hockey stick shafts. For example, the shaft may be thin-walled, hollow or may be full or may comprise any combination of materials and constructions. The constraining layer may provide reinforcement and stiffness to the shaft structure, while acting as an anchor for the viscoelastic layer. As may be understood, in accordance with a general aspect, the constraining layer is the core of the shaft and may provide all, i.e. substantially all of the structural strength, of the shaft.

Over the constraining layer, there is provided a viscoelastic layer, whose purpose is to shear or flex under impact loading. In accordance with one aspect, the constraining layer may be a soft flexible material which dissipates impact energy away from an impact zone, thus minimizing localized damage to the underlying constraining layer. As may be understood, the viscoelastic layer may act as a shock absorber to reduce the amount of impact energy transferred to the constraining layer. In particular, the constraining layer acts to dissipate the energy of an impact over a wider area of the underlying constraining layer, thus preventing the energy transferred to the constraining layer from reaching above the breaking point of the material of a particular localized area of the constraining layer. Thus, the viscoelastic layer may allow for localized impact protection. The viscoelastic layer may further allow a composite hockey stick shaft to strain or deflect at higher rates without cracking, breaking, delaminating or otherwise damaging the composite material resin matrix of the constraining layer.

In accordance with a further embodiment of the present invention, the viscoelastic layer may overlay the whole of the constraining layer, i.e. from one end of the shaft to the other end. Alternatively, the viscoelastic layer may be provided over a particular portion of the shaft, i.e. for example over the area or areas of the shaft which are subjected to the greatest impact or the greatest stress, i.e. for example near the middle of the shaft. In a further alternative embodiment, the viscoelastic layer may be provided over two or more separate and distinct areas of the shaft so as to provide maximum protection and minimizing any additional weight. In addition, the viscoelastic layer may be provided on all four faces of the shaft, or alternatively, on one or more of the faces, i.e. for example the faces of the shaft which are subjected to most wear and tear during play.

In addition to the above two layers, the present invention may provide for a composite hockey stick shaft wherein a base layer overlies the viscoelastic layer so as to provide protection therefor. In accordance with a particular embodiment, the base layer may be a thin, tough and stiff shell structure which may protect against mechanical damage to the viscoelastic layer caused by impacts, scrapes, bumps and other contact damage administered to the shaft during play. As may be understood, the base layer overlies the viscoelastic layer and may serve to protect it, therefore if the viscoelastic layer is not continuous over the constraining layer, the base layer may also not be continuous.

As may be understood, the expression <<viscoelastic material>> is meant to include any material which exhibits a high or very high elongation to failure characteristic. Further, <<viscoelastic material>> is also meant to include any material which has a damping property, for example which will dissipate or absorb the energy of an impact, or allow the shear forces to deform said material without destroying its structural integrity. In accordance with a particular embodiment, the viscoelastic material may be a thermoplastic rubber modified adhesive. In accordance with a further embodiment, the viscoelastic material may be one sold by 3M Corporation under the trade-mark SCOTCH DAMP, or under the trade-mark Viscoelastic Damping Film 110P, 122P and 130P. In addition, the viscoelastic material may be selected from the group comprising polyester (PET), Urethane, Polyurethane, Mylar, Tedlar, Silicone and Epoxy films.

In accordance with a further embodiment of the present invention, there may be provided a composite hockey stick shaft which utilizes a constraining-layer damping technology wherein the shaft may be constructed using an outer layer and an inner layer of composite materials, which layers sandwich therebetween a layer of viscoelastic material, damping material or rubberized material or any other material which may act to dampen impact forces and deflections which are applied to the shaft during play. In accordance with this embodiment, the outer and inner layers may be substantially the same thickness and are each designed to provide strength, stiffness and load carrying capacity to the shaft in approximately equal proportion. Alternatively, one of the layers may be thinner than the other, may even be substantially thinner, for example the outside layer. Thus, by nesting a viscoelastic layer between two layers of composite materials, i.e. such as fibers disposed in a resin matrix, a greater deformation of the shaft during play can be tolerated before reaching the breaking point of the composite materials. In effect, the relatively brittle composite material or the inner and of the outer layer are made to deform less, while more of the deformation is taken up by the viscoelastic material, for example, as a result of bending moment. As may be understood, when a hockey stick is in use, for example, during a slapshot, the shaft may deflect up to between 6 and 9 inches. The use of a viscoelastic material nested, i.e. disposed between an inner and an outer layers of composite material may allow for greater deformation thereof.

The thickness of the viscoelastic layer, in particular of the viscoelastic layer disposed between an equal thickness inner and outer layer, may be in the range of about 5 to 25 thousandths of an inch. In accordance with a further aspect, the thickness may be in the range of about 10 to 22.5 thousandths of an inch and may further be about 20 thousandths of an inch thick. As may be understood, the viscoelastic material may be manufactured as a thin film or sheet which may be delivered from the manufacturer thereof on a roll. When it is to be applied, for example onto the inner layer, it is cut into strips and disposed onto the outside surface of the inner layer. The viscoelastic strip may be cut in size so that it may be applied lengthwise onto the inner layer, i.e. in the direction of the length of the shaft, or alternatively the viscoelastic strip may be rolled circumferentially about the inner layer, i.e. for example at an angle to the length of the shaft. As may be understood, more than one strip of viscoelastic material may be used to create the damping layer, and each strip may be applied in a different manner onto the outside surface of the inner layer. Further, more than one layer of viscoelastic material may be applied, one on top of another, each having, for example similar or different damping characteristics.

In accordance with a particular embodiment of the present invention, the viscoelastic layer may simultaneously be in contact with the inner and the outer layer of composite materials. Thus, the viscoelastic layer may act as a bridge, transferring forces therebetween, such as bending moment and shear forces from the outer layer to the inner layer and vice versa. In the process of transferring forces, the viscoelastic layer deforms more than the outer and inner layers. Thus the viscoelastic layer may be act as an internal damper. By providing a layer which can take more of the deformation, stresses and loads will necessarily accumulate there, and not in the more brittle inner or outer layers; therefore avoiding or delaying failure thereof.

In accordance with a further embodiment of the present invention, there may be provided a hockey stick shaft having more than two layers of composite materials and one layer of viscoelastic material disposed therebetween. For example, there may be provided with a first (innermost) layer of composite materials onto which is applied a layer of viscoelastic material onto which is applied a second layer of composite materials, onto which is applied a further layer of viscoelastic material onto which is applied a further layer of composite materials. It is understood that each of the composite material layer may be different in materials used and in size, and that each of the viscoelastic material layer may also be different from the other. It is understood that two, three or more layers of viscoelastic materials may be used in this manner to construct a shaft as described.

In accordance with an embodiment of the present invention, there is provided for a
composite hockey stick having an elongated shaft body having opposed first and second ends:
said shaft body having a constraining inner layer comprising a thin-wall composite fibers construction disposed in a matrix material
said constraining layer being overlaid with a coating of viscoelastic material.

In accordance with a further embodiment of the present invention, there is provided for a
composite hockey stick shaft having an elongated body having four side wall members, at least one said side wall members comprising
an inner layer of fibers disposed within a matrix material,
a layer of viscoelastic material anchored onto to the outside surface of said inner layer,
an outer layer of fibers disposed within a matrix material, said outer layer being disposed on and abutting the outside of said layer of viscoelastic material.

DETAILED DESCRIPTION OF THE DRAWINGS

Other applications and advantages of the present invention may be made clear by the following detailed description of several embodiments of the invention. The description makes reference to the accompanying drawings in which.

DESCRIPTION OF THE EMBODIMENTS

Figure 1:
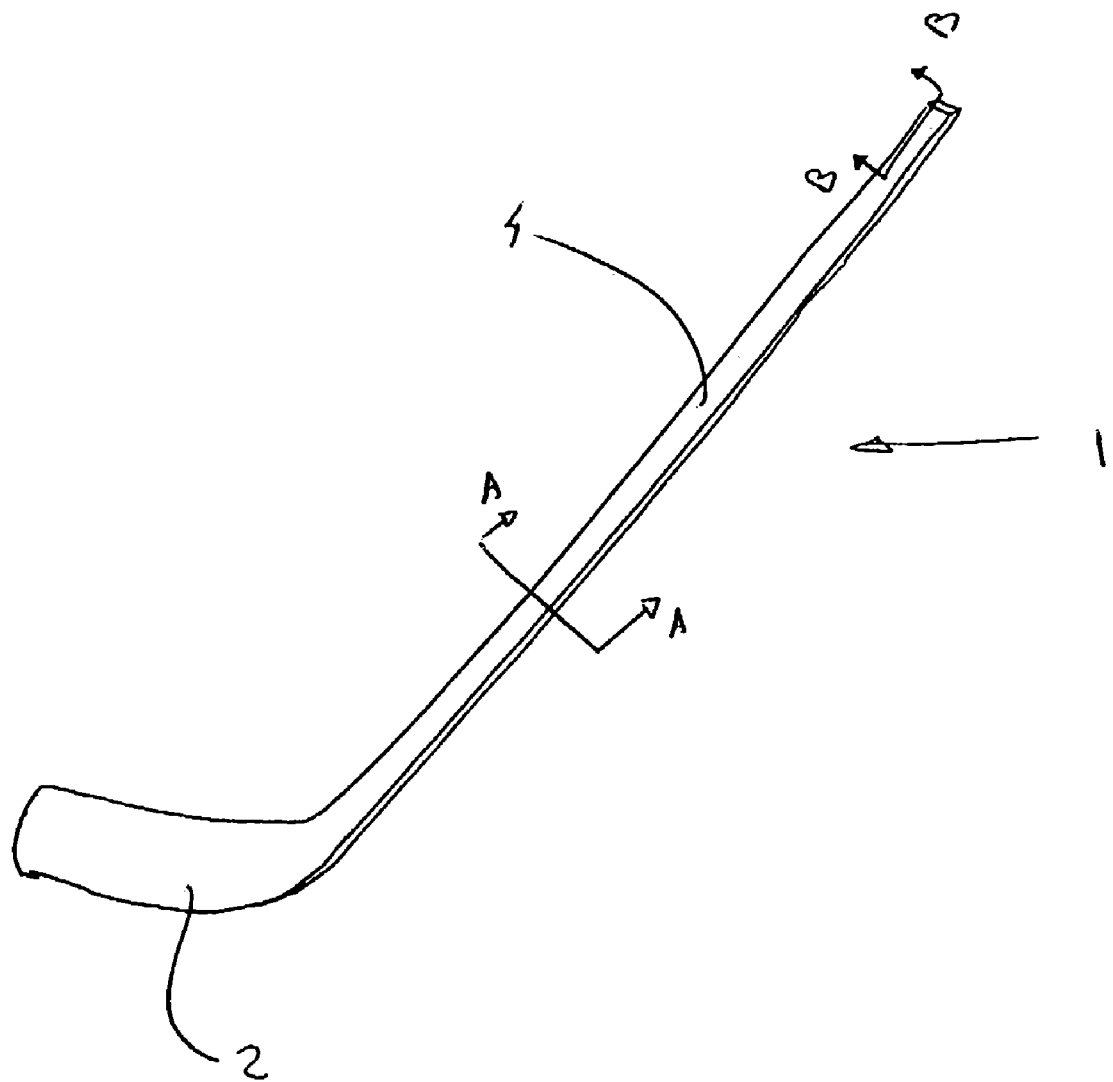
FIG. 1 is a three-dimensional illustration of a hockey stick having a composite hockey stick shaft in accordance with the present invention.

FIG. 1 is an illustration of a hockey stick 1 comprising a shaft which is attached to a blade. As may be understood, shaft 4 is made of composite materials and blade 2 may either be made of composite materials or of wood-fiberglass construction.

Figure 2:
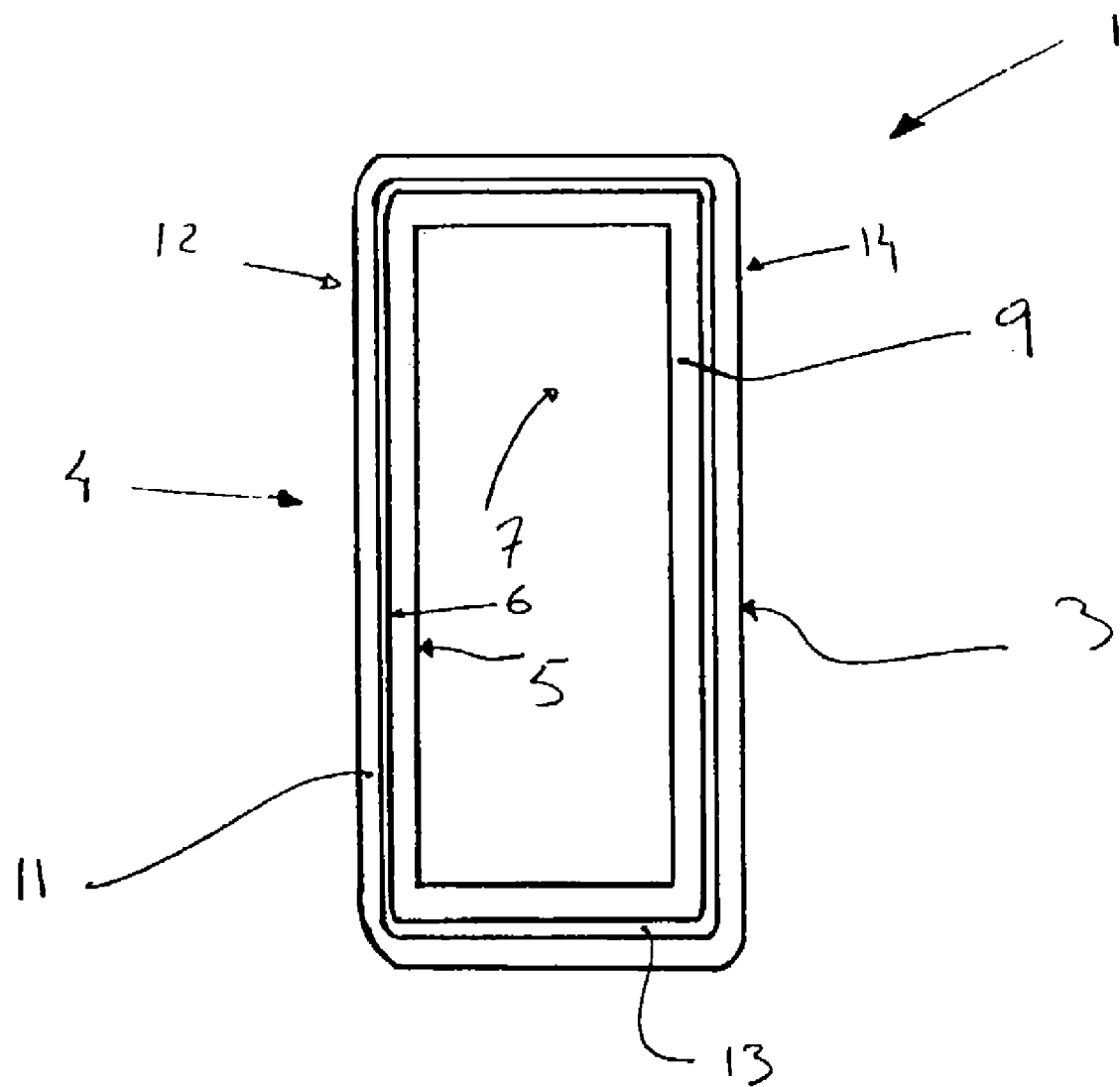
FIG. 2 is an illustration of a cross-sectional view of the shaft along section lines A—A of FIG. 1.

FIG. 2 illustrates a close-up of the cross-section of shaft 4 along section lines A—A of FIG. 1. As shown, the shaft construction is comprised of a number of layers, namely an inner layer 9 comprising an inside surface 5 and an outside surface 6. Further, the wall construction of shaft 4 comprises a viscoelastic layer 13 disposed adjacent to and abutting inner layer 9. Further, an outer layer 11 is disposed on an abutting viscoelastic layer 13. Viscoelastic layer 13 is shown contacting both the inner layer 9 and the outer layer 11.

As illustrated, viscoelastic layer 13 is applied to surface 6 of inner layer 9 once inner layer 9 has been constructed. As may be understood, final curing of inner layer 9 may not have been completed prior to the application thereon of viscoelastic layer 13. Further, outer layer 11 is applied onto viscoelastic layer 13 once said viscoelastci layer 13 has been applied. It is understood that the curing of inner layer 9 and outer layer 11, or the final curing of inner layer 9 and outer layer 11 may be completed subsequent to the assembling of the wall structure illustrated in FIG. 2.

Inner layer 9 and outer layer 11 are shown as being substantially of the same thickness, and further illustrated as having the same thickness on all four faces. Further, viscoelastic layer 13 is illustrated as having substantially the same thickness on each of the four faces of shaft 4. It is understood, however, that the thickness of viscoelastic layer 13 may not be the same on all four faces of shaft 4, for example on one or more faces of shaft 4, namely on opposed faces 12 and 14, the viscoelastic layer 13 may be thicker. It is understood that viscoelastic layer 13 may not have a constant thickness along the length of the shaft, but may have a different thickness, i.e. may be thicker at one or more points along the shaft where loading requirements, impact and stress transfer requirements may be greater. It is further understood that viscoelastic layer 13 may vary in thickness along the length of the shaft so as to provide additional damping ability where it may be most required, i.e. for example in the middle of the shaft.

Figure 3:
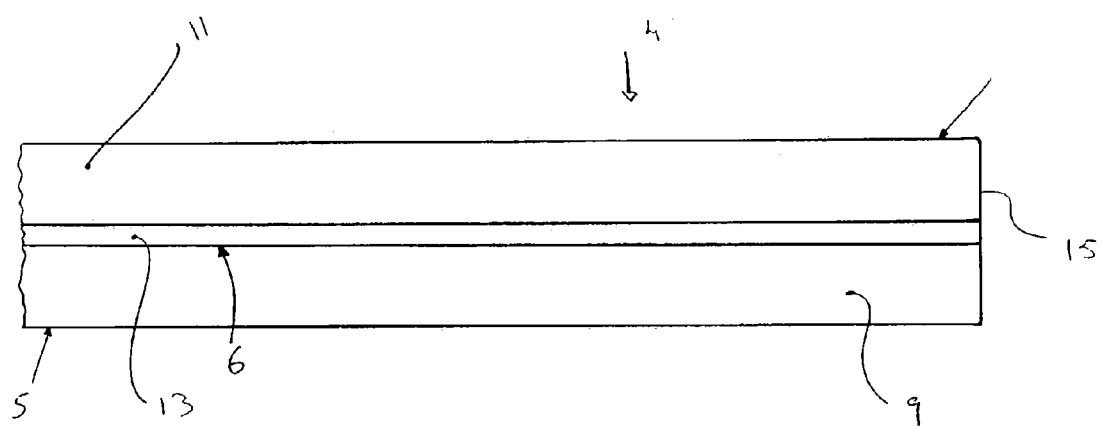
FIG. 3 is a close-up of a portion of the wall of the shaft along view lines B—B of FIG. 1.
Figure 4:
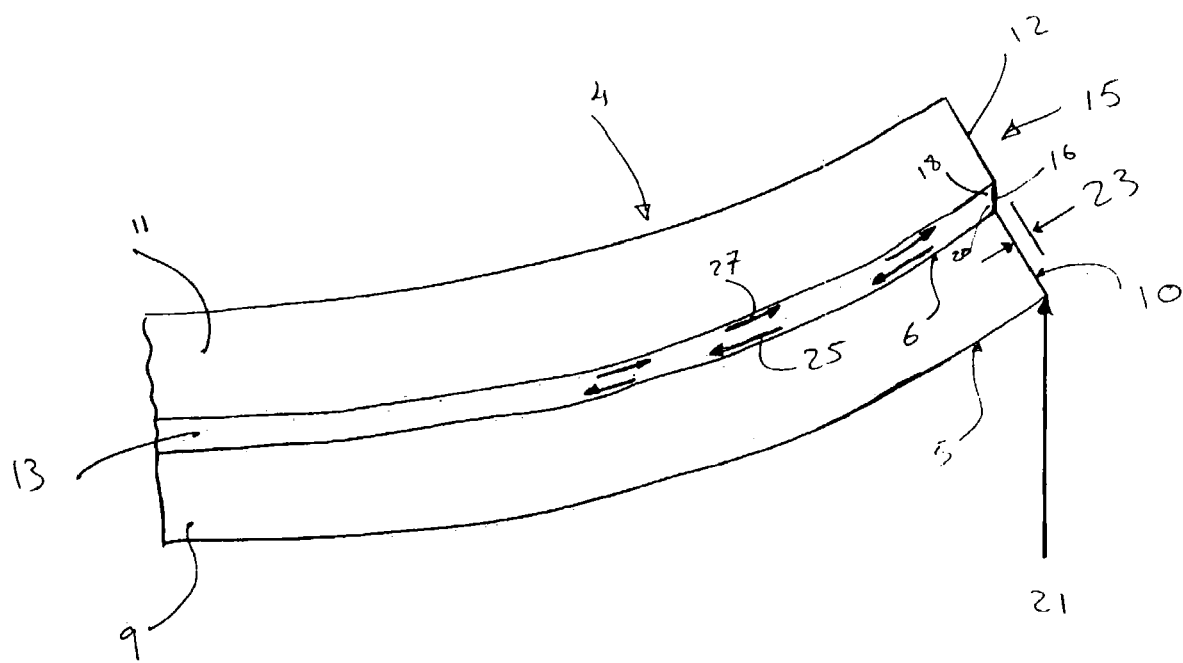
FIG. 4 is a further close-up of the wall of the shaft of the hockey stick along view lines B—B showing the stick being deformed when subjected to an impact force.

FIGS. 3 and 4 illustrate a close-up of shaft 4 along view line B—B of FIG. 1. As may be understood, only one wall of shaft 4 is illustrated. The uppermost extremity 15 of shaft 4 is shown. As may be understood, the scale has been exaggerated for ease of viewing.

FIG. 4 illustrates the close-up of FIG. 3 undergoing a deformation caused by the application of force 21. The scale of the deformation has been exaggerated for ease of viewing.

As may be understood, the application of force 21 may occur along any length of shaft 4, and even though force 21 is illustrated in FIG. 4 as being a pointlike application, it is understood that shaft 4 may be subjected to different types and combinations of loads.

As illustrated, shaft 4 is shown being deflected upwardly in the direction of force arrow 21. As shown, outer layer 11 is shown having been deflected upwardly a distance similar to the deflection incurred by inner layer 9. However, said deflection of outer layer 11 may be smaller than the deflection of inner layer 9 since the viscoelastic layer 13 may also have deformed. Since viscoelastic layer 13 may deform more than either of inner layer 9 or outer layer 11, more of the load 21 may be taken up, i.e. absorbed, i.e. dissipated by the deformation of viscoelastic layer 13 than by either of inner layer 9 or outer layer 11. As a result, viscoelastic layer may, for example, flatten and become thinner, thus allowing outer layer 11 to deform less than inner layer 9.

In addition to the above, a beam-like structure, such as a hockey stick shaft, will under cantilever and other types of loading, exhibit bending moment forces. Such bending moment forces occur horizontally, i.e. are translated inside the structure horizontally, i.e. at roughly 90 degrees to the direction of the force applied. Bending moment forces are illustrated by force arrows 25 and 27, namely substantially horizontal forces which are incurred by shaft 4 by a deformation at end 15 in the direction of motion arrow 21.

As each of inner layer 9 and outer layer 11 are relatively stiff and unyielding, the endmost portion 10 of, for example, inner layer 9, will under the loading conditions of force 21 remain substantially at 90 degrees to surfaces 5 and 6. Similarly, endmost portion 12 of outer layer 11 will also remain substantially at 90 degrees. However, the viscoelastic layer 13 can deform due to its material properties, the whole as shown by reference number 16. Thus, as may be understood, bending moment force arrows 25 and 27 cause the deformation of viscoelastic layer 13, such that in the illustrated example, angle 18 is less than 90 degrees and angle 20 is greater than 90 degrees. This deformation of the viscoelastic layer 13 uses up some of the energy of force 21, which energy is absorbed by the material of viscoelastic layer 13 when it deforms. Said deformation is illustrated by distance 23, namely the difference between endmost portions 10 and 12, which is indicative of the ability of viscoelastic layer 13 to deform and absorb impact forces.

Figure 5:
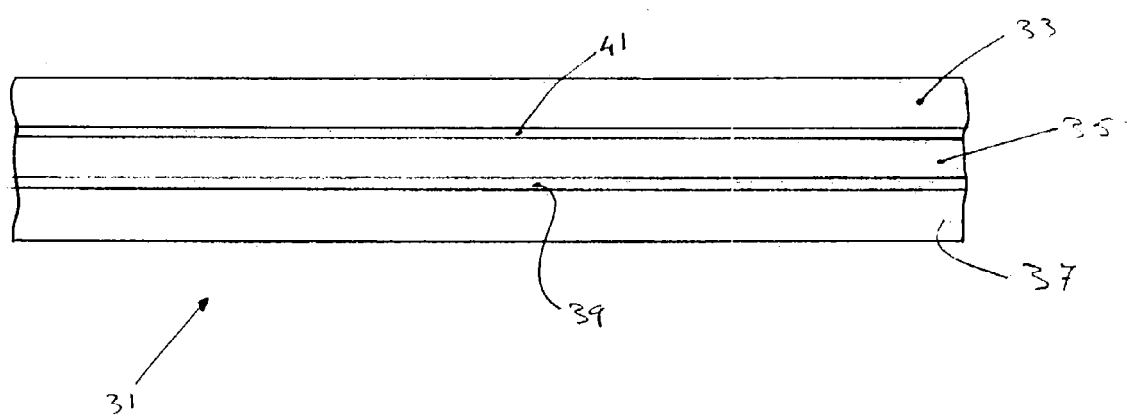
FIG. 5 is an alternative embodiment of the shaft construction of the present invention.

FIG. 5 illustrates an alternative embodiment of the wall construction of FIG. 3, wherein three composite layers 33, 35 and 37, are spaced apart by two viscoelastic layers 41 and 39. As illustrated, composite layer 33 is thicker than composite layer 35 while viscoelastic layer 41 is made up of a different material than viscoelastic layer 39.

I claim:

1. A hockey stick shaft comprising:
an elongated body having opposed first and second end, said body comprising
an inner constraining element having opposed first and second major wall components spacing apart opposed third and fourth major wall components, said first and second major wall components being wider than said third and fourth major wall components, said inner constraining element providing the structural strength of the shaft,
said first and second major wall components comprising first and second flat side surfaces disposed on the exterior thereof, said third and fourth major wall components comprising third and fourth flat side surfaces disposed on the exterior thereof, said first, second, third and fourth side surfaces each being overlaid with a layer of viscoelastic material along said inner constraining element, the thickness of said viscoelastic material on at least two of said first, second, third and fourth side surfaces being thicker than on said remaining side surfaces, said body further comprising a protective element comprising opposed first and second thin-shelled components spacing apart opposed third and fourth thin-shelled components, said protective element being disposed on said layer of viscoelastic material, wherein said viscoelastic material being of a sufficient thickness to provide protection to said inner constraining element from impacts applied to said protective element.

2. The hockey stick shaft of claim 1 wherein said at least two of said thicker first, second, third and fourth side surfaces are adjacent to each other.

3. The hockey stick shaft of claim 1 wherein said at least two of said thicker first, second, third and fourth side surfaces are opposed to each other.

4. The hockey stick shaft of claim 1 wherein said inner constraining element comprises fibers disposed in a matrix material.

5. The hockey stick shaft of claim 1 wherein said protective element comprises fibers disposed in a matrix material.

6. The hockey stick shaft of claim 1 wherein said viscoelastic layer is selected from a group comprising thermoplastic rubber midified adhesive, polyester, urethane, polyurethane, mylar, tedlar silicone and epoxy films.

7. The hockey stick shaft of claim 6 wherein said viscoelastic layer is disposed from a point adjacent said first end to a point adjacent said second end.

8. The hockey stick shaft of claim 6 wherein said viscoelastic layer has a thickness in the range of about 5 to 25 thousands of an inch.

9. The hockey stick shaft of claim 8 wherein said viscoelastic layer has a thickness in the range of about 10 to 22.5 thousands of an inch.

10. The hockey stick shaft of claim 9 wherein said viscoelastic layer has a thickness of about 20 thousands of an inch.

* * * * *